United States Patent
Guduguntla et al.

(10) Patent No.: US 10,536,823 B1
(45) Date of Patent: *Jan. 14, 2020

(54) DETERMINING DEVICE QUALITY SCORE

(71) Applicants: Vamshi Guduguntla, Raleigh, NC (US); Colby Greene, Raleigh, NC (US); Andrew Schrader, Raleigh, NC (US)

(72) Inventors: Vamshi Guduguntla, Raleigh, NC (US); Colby Greene, Raleigh, NC (US); Andrew Schrader, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/262,348

(22) Filed: Jan. 30, 2019

(51) Int. Cl.
| | |
|---|---|
| H04W 24/00 | (2009.01) |
| H04W 4/23 | (2018.01) |
| H04W 4/029 | (2018.01) |
| G06Q 30/02 | (2012.01) |
| H04W 68/00 | (2009.01) |
| H04W 4/02 | (2018.01) |

(52) U.S. Cl.
CPC .......... *H04W 4/23* (2018.02); *G06Q 30/0267* (2013.01); *H04W 4/023* (2013.01); *H04W 4/029* (2018.02); *H04W 68/005* (2013.01)

(58) Field of Classification Search
CPC ....... H04W 4/02; H04W 8/245; H04W 48/04; H04W 64/00; H04M 1/72533
USPC ................... 455/418–420, 456.1–456.6, 457
See application file for complete search history.

(56) References Cited

U.S. PATENT DOCUMENTS

| | | | |
|---|---|---|---|
| 2007/0178909 A1* | 8/2007 | Doyle ................... | G01S 5/0027 455/456.1 |
| 2014/0018111 A1* | 1/2014 | Farley ................... | H04W 4/023 455/456.6 |
| 2015/0126148 A1* | 5/2015 | Hong ..................... | H04W 64/00 455/405 |
| 2016/0019499 A1* | 1/2016 | Bhalodia ............ | G06Q 10/0833 705/40 |
| 2016/0132046 A1* | 5/2016 | Beoughter ......... | G05B 19/4184 700/17 |
| 2016/0210978 A1* | 7/2016 | Chebiyyam ........... | G10L 19/083 |
| 2017/0078315 A1* | 3/2017 | Allen ..................... | G06F 16/285 |
| 2017/0300836 A1* | 10/2017 | Byrne ..................... | G06Q 10/02 |
| 2018/0082260 A1* | 3/2018 | Dunn .................. | G06Q 10/1093 |

* cited by examiner

*Primary Examiner* — Matthew W Genack
(74) *Attorney, Agent, or Firm* — John L. Sotomayor (57) ABSTRACT

The present invention is a method and system for scoring the reliability of a predictive determination regarding the assigning of a geographic location, such as a work or home location, to the owner or user of a mobile device. Mobile devices such as smart phones, tablets, internet computers, and other hand-held mobile devices may be preferentially targeted for ads based upon the geographic location of the owner or user of the mobile device. The home or work location is determined based upon startup events associated with the mobile device as tracked by startup activations of the mobile device, beacon activations, tile activations, or any other Bluetooth or near field communication device activation, during either day time or night time hours. Reliability scoring of the determination is affected through extraction and normalization of discrete features of a device.

18 Claims, 4 Drawing Sheets

DETERMINING DEVICE QUALITY SCORE

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

The smartphone is a mobile device that is a unique technology device in that it is one of the first devices to be almost exclusively individual and personal. Additional mobile devices, such as tablets, iPads, internet capable watches, and other handheld mobile devices, provide similar functions and access to technology to users as they travel or move about on daily errands, much as the smartphone is capable of providing. Such mobile devices have become so useful that they are essential to users and are typically kept on or near the person of each user at all times, with users installing applications that are useful or simply desired so as to be readily available to the user whenever wanted.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an exemplary embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to a point rank algorithm refers to a point rank index and the specific latitude and longitude coordinates for each activation by a proximity activation system.

Reference throughout this document to a beacon refers to a low energy Bluetooth (BLE) device operating as a proximity activation system that transmits packets of data that allow smart devices (such as phones, tablets, computers, handheld devices, game devices, etc.) to be informed when they are in range, and where smart devices are capable of calculating their proximity to the beacon.

Reference throughout this document to a high value geographic location refers to a spatial location having significance to the owner or user of a mobile device. As non-limiting examples, a high value geographic location may be a home, a place of business, a place of worship, or some other location where the owner or user of a mobile device repeatedly spends time.

Reference throughout this document to a trigger event refers to a startup event associated with a mobile device and/or reception of an activation signal from a proximity activation system.

References throughout this document to a daypart refer to a chronological portion of a day from a starting time to an ending time. As non-limiting example, a daypart may represent hours spent working or hours spent at home.

Reference to "application use features" refers to device use data including but not limited to the number of days that an application is active, the average event count per day, the number of "clusters" of geographic events formed during application use, the number of locations matched as being Points of Interest for the user, accuracy of the user's Geographical Positioning System (GPS) data, all Internet Protocol (IP) addresses and WiF SSID data implicated during the application use, the velocity of a device based upon GPS data, the altitude of a device based upon GPS data, and the presence of the device at the user's home or work addresses.

Reference to "normalization" refer to reduction of raw user-related data to a normal distribution data set using generally accepted statistical methods, including but not limited to logarithmic smoothing.

Reference to "deviceID" refers to a handle for a parameter within a software routine, and may be used to refer to the data record of all data capable of capture from a particular device.

Reference to "Points of Interest (POI)" refers to geographic locations revealed as important to a user of a device by the frequency of event clustering associated with those locations.

The apps that are installed on a mobile device are a reflection of the user's life, interests, work, lifestyle, and beliefs. Clustering geographic events from a device history to determine high-frequency or other important locations for a device such as work and home locations may be accomplished through activation and use of apps installed on a mobile device. It is unusual for a mobile device to receive signals from a proximity location system while at work or at home. For this reason, determining work and home locations without direct input from a user of a mobile device is difficult. However, aggregating activation events for a mobile device and analyzing patterns associated with home events and work events based upon machine learning algorithms utilizing feedback information from a geographical database engine may provide information on work and home physical locations.

Mobile applications do not utilize cookies. In common practice, cookies track the locations a user visits across the web through the mechanism of placing a small tracking file, or cookie, within a user's computer system making it simple to capture demographic information about the user of the device. These cookies are usable by the application or web page that placed it within the cookie folder on the user computer file system. In a non-limiting example, because cookies can't track digital locations in mobile devices, physical location like latitude and longitude coordinates or activation by a proximity activation system must be used as a replacement for the cookie mechanism to determine locations that users visit in the real world and to collect demographic and use information while the mobile device is active.

Utilizing location information gathered from a proximity activation system, such as, in a non-limiting example, a beacon, provides highly accurate location information for a mobile device that comes within range of the proximity activation system signal. In a non-limiting example, when a mobile device detects a Beacon's signal, an application on the mobile device uses the Received Signal Strength Indication (RSSI), which is compared against a pre-set distance to signal strength ratio, to determine proximity to the Beacon as well as the accuracy of its estimation of proximity. The stronger the signal, the more confident the mobile device can be about the proximity of the Beacon, however, the location may still be too difficult to determine based solely upon the strength of the signal. Refining the location of a mobile device may require a location determination system to increase location accuracy.

A mobile device having the Reveal™ API downloaded will track and manage gathered information about the user or owner of the mobile device. When a user enters the signal range of a proximity detection system, such as a beacon, or when the Reveal™ app is opened or activated, an event is triggered and sent to the Reveal™ application server. The event is recorded in the database associated with the Reveal™ application server and transmits the location information in terms of latitude and longitude values when the event occurs. The latitude and longitude values represent the Global Positioning System (GPS) location of the mobile device when the event is triggered.

In an exemplary embodiment, an event is a "startup" event if the location information associated with the event is sent to the Reveal™ application server when the user of the mobile device initiates the Reveal™ app on the mobile device and there is no signal from a proximity activation system. The startup events are the most valuable in terms of discovering location such as work and home due to the fact that most users of mobile devices will open one or more applications when starting their work shift, or when changing from home status to work status, or when changing from work status to home status. When analyzing all points of geographic data that are associated with startup and proximity activation events, the algorithm determines the order of clusters of startup and activations in terms of size, where the size of a circle representing a cluster is proportional to the number of events in that cluster. The biggest cluster may be assigned reasonably as the home location of the mobile device because a user will generate startup events most often from the home location. Another check to provide greater confidence in the determination of a home location for the mobile device may be a periodic city check over time, so as to remove likelihood of going on a trip or on vacation as deterministic of home. Thus, when analyzing aggregated events for any particular mobile device, the events that are of greatest interest in determining home and/or work locations are startup events.

In the exemplary embodiment, a mobile device typically transmits latitude and longitude data regarding the location of the mobile device on a regular basis. Because the latitude and longitude data for the mobile device indicates the true path taken by a user, certain patterns associated with the location coordinates may be determined by analyzing the accumulated event data. Thus, when attempting to determine the home and work locations for a user associated with a particular mobile device, the Reveal™ application server may use aggregated startup event data accrued by the mobile device over a period of time.

In an exemplary embodiment, the Reveal™ system may determine the device home location by first filtering out the startup events for the device during a time when the mobile user is more likely to be found at home. This is done by clustering the latitude and longitude information for each activation of the startup event data and obtaining the feedback from the geographical database information for each startup event. The geographical database information returns an indication of whether the location is residential or not residential based on the latitude and longitude information included with the query. Using this information, a learning model is constructed to perform an analysis on the stored data and determine when the mobile user resides at home and when the user is at work. Upon completion of each work/home determination, the event data and the work or home determination data are provided to the Reveal™ system algorithms for additional analysis.

In this exemplary embodiment, all of the events discovered from this filter process are transmitted to a point rank algorithm residing and operating on the Reveal™ application server. The point rank algorithm creates a point rank index that provides an index threshold for the value of the event with regard to all events associated with the mobile device, and provides the specific latitude and longitude coordinates captured upon activation of the app and for each startup event. The Reveal™ server initiates an activation algorithm to analyze each startup event to assess when the startup events should be included in the determination of a home location assignment for the mobile device. In order to be assigned a home location, a mobile device should exceed the point rank index threshold pre-configured by the system. Exceeding the point rank index provides a degree of confidence in the prediction of the home location assignment to the mobile device.

In this exemplary embodiment, as additional events accrue, a typical mobile device would be scanned for events that contribute to the verification of the assignment of home location on a regular, recurring basis. As additional events are detected, the point rank algorithm analyzes the accumulated event data to contribute additional data points to the determination of the home location assignment. As additional event data points are added to the determination of the home location assignment, the event data points serve as a check on the determination and improve the confidence level of the home assignment prediction by the Reveal™ server.

In an exemplary embodiment, just as the home location may be determined a similar process may be performed to predict and assign a work location for a user associate with a mobile device. Just as the largest cluster of startup events over time may be deterministic of a home location, the second largest, that is consistent and repetitive over time, may be most deterministic of work location for the mobile device. Determining a person's work location can be a very difficult task. Usually there are fewer startup events at work because the user doesn't check their mobile device at work as often, and most work places that are office buildings generally do not have installed beacons which would generate a beacon bump. The process to determine the work location for the mobile device, and, by association, the work location for the user associated with the mobile device, begins by filtering startup events captured for the device during business hours associated with a particular work shift. The Reveal™ server may be configured with a certain time span as "normal" business hours for that particular work shift. The time span for "normal" business hours may be denoted as set (B). The time span for home hours may be denoted as set (H), and the total hours in a day is denoted as set (T). The business hours are then given by:

$$Set(B)=set(T)-set(H).$$

The Reveal™ server analysis module then clusters the events that are associated with business hours using the Density Based Spatial Clustering And Noise (DBSCAN) algorithm. DBSCAN returns a result of a visual representation for each cluster of events as a circle with the diameter of the circle being directly proportional to the number of events within a cluster that are associated with the mobile device. In this non-limiting example, the circle representing a cluster of 5 events would be approximately half the size of the circle representing a cluster of 10 events. The Reveal™ server analysis module then selects the cluster having a circle with the largest diameter and captures all of the events that contribute to the selected cluster. The selected events are provided to the point rank algorithm in the Reveal™ server analysis module and the point rank module returns the point rank index and the specific latitude and longitude that represent the center point of the circle for the selected cluster. In this exemplary embodiment, the Reveal™ server may assume that the work location is associated with the point rank result that exceeds the point rank index threshold and that is the cluster with the largest number of events during business hours. If the calculated point rank index exceeds the point rank index threshold, a work location assignment for the mobile device may be assigned to the latitude and longitude associated with the selected cluster.

In an exemplary embodiment, the Reveal™ application server may utilize the home and work location information derived from the point rank analysis in combination with a logged recorded history for the mobile device to create one or more predictive recommendations for subscribers and users of the Reveal™ system. In this exemplary embodiment, the application server may have an installed module that analyzes the beacon activations geographical location in relation to the time of day to determine activities associated with a physical path over time. With this feedback and verification signal, the application server may communicate a particular message, ad, or other signal to the relevant mobile device associated with the home and/or work location established for the user or owner of a mobile device.

In an embodiment, mobile device users who perform a particular activity on a routine or highly frequent basis are those individuals for whom marketing is unnecessary. However, incentives may be presented to such mobile device users in an attempt to increase wallet spend. Such incentives may be more effective for a female gender, or more effective for a male gender dependent upon the design of the incentive and the goal of any incentive program. The ability to target mobile devices associated with a particular home or work location increases the ability to deliver geographic and/or workplace motivated incentives. Incentives may also be presented when an analysis of behaviors of such frequently encountered mobile device users provides an indication that the mobile device user activity, as measured by beacon interactions, is decaying over time. Such incentives may be presented not to increase wallet spend, but to attract and retain such customers to retail establishments in proximity to the beacons with which the user interacts. This increases the customer lifetime value and is an important metric in marketing activities.

In a non-limiting example, the Reveal™ system may have a priority queue, separate from the main persona tracking database, that creates and presents incentives to such high priority targeted mobile device users. If a mobile device user is recognized as frequenting a certain area or retail establishment, based upon beacon activations, the one or more personas assigned to that mobile device may be identified as high priority customers and may be placed in the priority queue. This priority queue may be set up as a business rule to deliver ads to mobile devices in locations that have been identified as high priority. In a non-limiting example, a home location may be used to determine the delivery of specific political ads to individuals whose home location places them in a geographic location in which they are represented by a particular politician, or in which a particular referendum may be taking place. This priority queue may be created and maintained separate from the main persona database.

In this non-limiting example, the application server may be able to provide, for a small fee or other consideration, predictive information on the likely purchases at any particular shopping location or performance venue to permit the generation of "instant savings" coupons, special deal ads, or informational messages tailored for specific geographic locations associated with that mobile device.

In an embodiment, the Reveal™ application server may integrate with a plurality of advertising servers. This direct communication pathway will permit tracking and management of every advertising and informational message delivered to every device within the sphere of the advertising server. The direct integration with advertising servers may strengthen attribution reporting and permit stronger correlations between delivered messages and mobile devices. This data may be collected in one or more Reveal™ and/or advertising server databases and managed by one or more Reveal™ analytics management processes. The data collected may provide for the creation of location-based metrics for particular mobile devices, or may provide information that may be used to target classes of mobile devices based upon work or home location.

This analytic information may be used to create predictive advertising for the mobile devices. In this process, advertising data may be targeted for delivery to a mobile device based upon predictions of future intent for each mobile device based upon home and/or work locations associated with mobile devices.

In an embodiment, more robustly accurate predictions regarding device location may be possible through normalization of extracted features of a device. By way of a non-limiting example, predicted location information can be associated with a particular device's deviceID. From one or more servers, the deviceID can be paired with past event data associated with the device. Similarly, the deviceID can be associated with Points of Interest. The one or more servers may be employed to extract from the device associated with the Device ID, certain data features, like Global Positioning Service (GPS) data, to provide a location memory for the device. These extracted application use (AU) features may then be statistically normalized to provide a higher degree of location certainty. Normalized AU features may then be scored with a Scoring Function to generate a Score of data reliability.

In an embodiment, deviceID and user data may be detected by a beacon employing any near-field communication system. In a non-limiting example, low-power Bluetooth technology may be employed to accumulate user data as the device passes through a data transmission field. An application may communicate deviceID and user data, comprising AU features, to one or more servers.

In an embodiment, extracted AU features may include indicia such as the number of days the device or application is active, the average event count per day, where the event may be determined by a number of different indicia, the average event count per day, the number of data clusters that are formed, the number of physical places that are matched with the Points of Interest, the accuracy of the GPS data, any and all IP addresses implicated during the period of activity, any and all WiFi SSID indicators implicated during the same period, data including device speed and/or altitude implicated during the period of activity, and the periodic relationships between the device and the user's home and/or work addresses. The extracted AU features are used by one or more servers, in an embodiment, to make predictions regarding the type of location at which the device is co-located. By way of non-limiting example, such locations may include a user residence or place of business.

In an embodiment, the extracted AU features may be statistically reduced to produce a normalized distribution data set. Among other non-limiting benefits, such normalization can provide statistically superior data sets for a weighting function to process. In a non-limiting example, normalization may use logarithmic smoothing for standard normal distribution. Mean and standard deviation of individual deviceID AU features may be calculated based upon the normalized data set. Individual deviceID AU features may then be scaled using calculated mean and standard deviation for the entire user population.

In a non-limiting example, a scoring function may then be used to calculate the weighted sum of all normalized AU features of the deviceID, solidifying the quality of the device location determination. In a non-limiting example, devices characterized by jittery locations (a time-limited multiplicity of location hops) may be penalized as evidencing low reliability. Any prediction of the device location type may by such calculations be made more accurate.

In an embodiment, the innovation described herein is a system for determining and assigning high value geographic locations to a mobile device using a mobile device in communication with one or more applications, initiating the operation of the one or more applications on the occurrence of a trigger event, storing the notification of a trigger event in a relational database maintained in an electronic storage element associated with the mobile device, storing received physical location data, an identifier associated with the mobile device, a timestamp associated with said trigger event, and application use features in the relational database, extracting the application use features, normalizing the application use features, the application server analyzing startup events recorded in the relational database according to the normalized application use features to determine one or more high value geographic locations, assigning said one or more high value geographic locations to the mobile device, and displaying the determined one or more high value geographic locations on a display associated with the application server.

In an embodiment, the innovation described herein is a method of determining and assigning high value geographic locations to a mobile device including sending an event notification from a mobile device to an application server, the application server extracting physical location data, an identifier associated with a mobile device, and application use features from the notification, storing the physical location data, the identifier, and the application use features in a relational database, extracting the application use features, normalizing the application use features, analyzing the contents of the relational database according to the normalized application use features to determine one or more high value geographic locations, and assigning said one or more high value geographic locations to said mobile device, making the one or more high value geographic locations known to other applications within said mobile device, and displaying the determined one or more high value geographic locations on a display associated with the application server.

In an embodiment, the innovation may further comprise a trigger event consisting of a startup event or reception of an activation signal from a proximity activation system. The startup event may be an event initiated by the initiation of one or more applications when the mobile device is not within range of a proximity activation system. In an embodiment, the analysis of startup events performed by the application server may comprise detection of spatial clustering of the physical location data associated with a daypart. The analysis of startup events performed by the application server may further comprise constructing a learning model to increase the confidence level of the one or more high value geographic locations, determining that the one or more high value geographic locations have changed, and/or determining that the times defining the daypart have changed. In a non-limiting example, the one or more high value geographic locations may be a home location and/or a work location.

In an embodiment, the innovation described herein may further comprise making available the one or more high value geographic locations for use by other applications active on the mobile device via an Application Program Interface (API). The innovation described herein may further comprise one or more sets of analysis and business rules, where the application server software analyzes the one or more high value geographic locations, the one or more sets of analysis and business rules, a current date and time, and a current location to determine a notification or message to deliver to the mobile device and delivering said notification or message. In a non-limiting example, the innovation herein described may affect normalizing through logarithmic smoothing.

Figure 1:
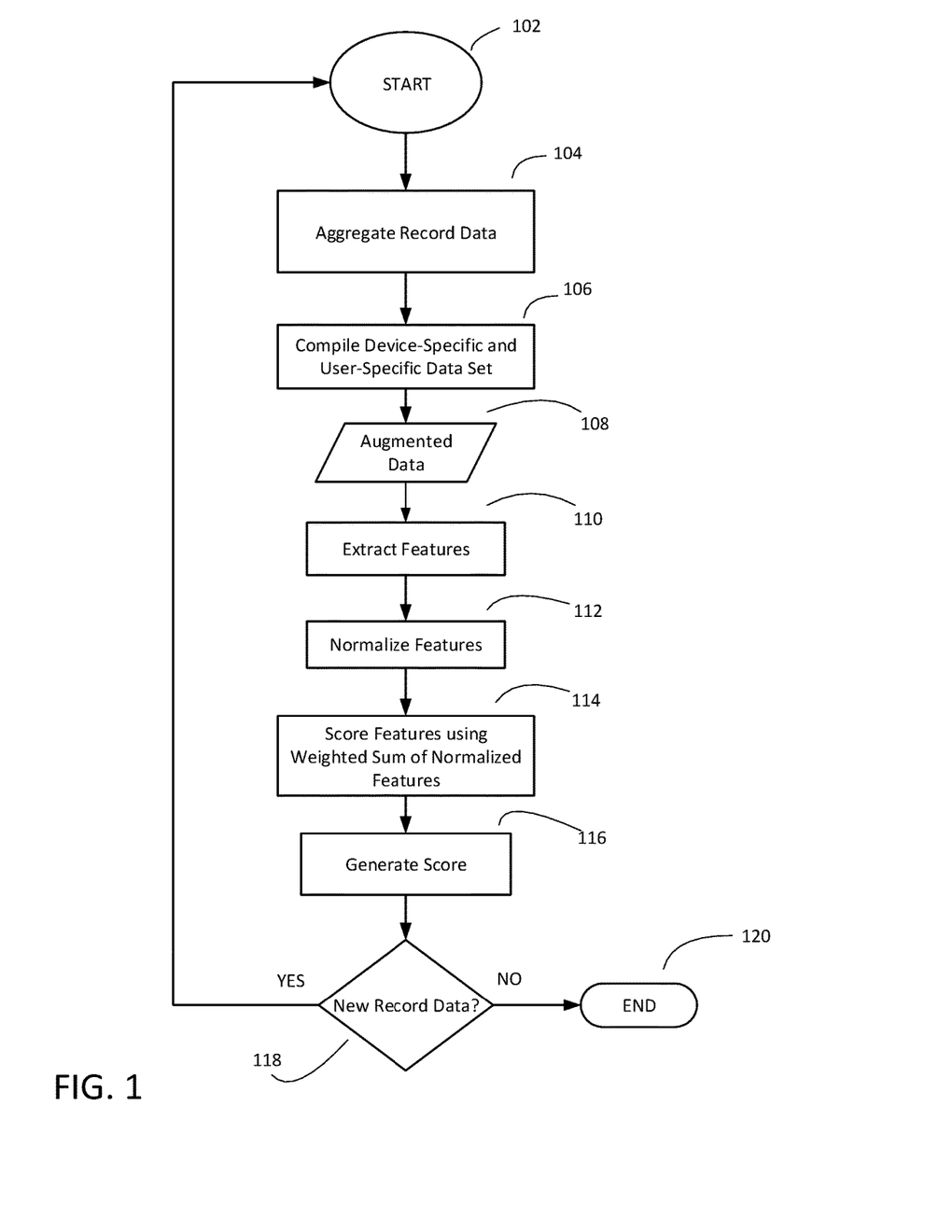
FIG. 1 is a process flow diagram for an exemplary process configuration consistent with certain embodiments of the present invention.

Turning now to FIG. 1, a process flow diagram for an exemplary process configuration consistent with certain embodiments of the present invention is shown. In an embodiment, at 102, the overall data collection and parsing process begins. At 104, the system collects or aggregates record data composed of, but not limited to, past event data associated with a particular device, the deviceID, and Point of Interest (POI) matches. At 106 the system compiles a device-specific and potentially user-specific data set to produce augmented data at 108 that reflect historical and real-time use attributes and can be further processed for certain inherent use characteristics. These use characteristics form application use features that are extracted at 110. In a non-limiting example, such features may be the number of days that an application is active, the average event count per day, the number of clusters that are formed, the number of physical places that are matched with Reveal™ POI, the calculated accuracy of the GPS data, device-interfaced IP addresses, device-interfaced WIFI SSID, attributes of the device such as velocity and altitude calculated based upon, in a non-limiting example, GPS data, and the presence of a device at a user's home and/or work address. At 112, these extracted features are statistically normalized such that the data is reduced to a normal distribution data set. Such normalization is affected through use of logarithmic smoothing using standard normal distribution. Normalization determines mean and standard deviation of individual device features from the population. The deviceID features are then scaled using mean and standard deviation of the entire population. The overall normalization of extracted features results in a more robust and reliable data set suitable for scoring. At 114, the normalized features are scored utilizing the weighted sum of all normalized features. At 116, the scoring function produces a score indicative of the reliability of any particular data prediction based upon data produced as a byproduct of normal user interaction with a particular device. If at 118 the system encounters new record data, the system begins the process anew. Otherwise, the process ends at 120.

Figure 2:
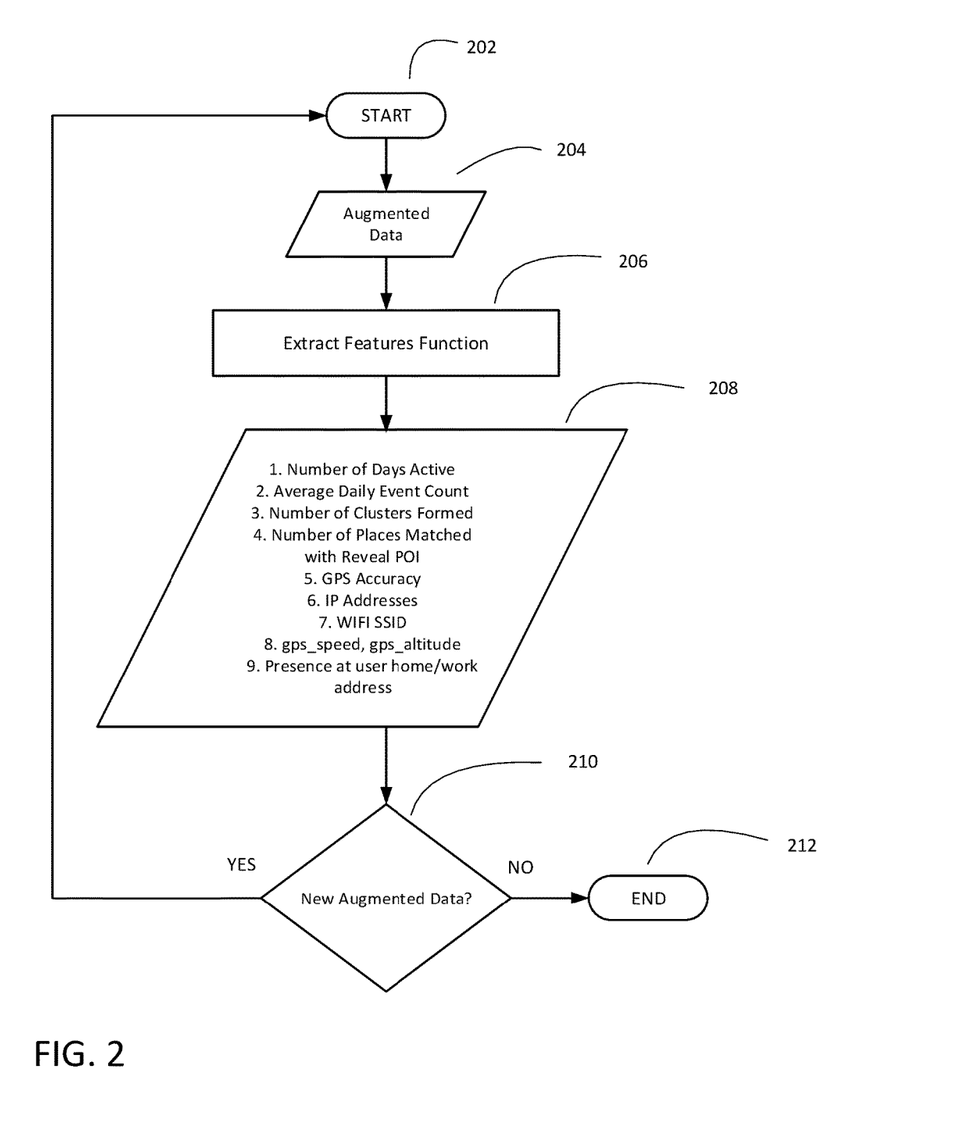
FIG. 2 is a process flow diagram illustrating an extract features function consistent with certain embodiments of the present invention.

Turning to FIG. 2, a process flow diagram illustrating an extract application use features function consistent with certain embodiments of the present invention is shown. In an embodiment, the process begins at 202. At 204, augmented data is input to an extract features function 206. The extract features function 206 produces extracted features at 208 that, in a non-limiting example, may consist of the number of days the device is active, the average daily event count, the number of clusters formed, the number of places matched with Reveal™ POI, the calculated accuracy of the device GPS, device-interfaced IP addresses, device-interfaced WIFI SSID, attributes of the device such as velocity and altitude based upon, in a non-limiting example, calculated GPS data and denominated gps_speed and gps_altitude, and the presence of a particular device at a user's home and/or work address. The gps-altitude may provide an indication that the device associated with a user is located in a multistory building and some indication of which floor within that multistory building the device is located when an activation event occurred. In this fashion, the system may determine that the home or work location of a device is a location above ground level in a particular geographic location, or within a multi-story building, and approximately what level above ground level within the multi-story building the device is located. If at 210 the system encounters new augmented data, the system begins the process anew. Otherwise, the process ends at 212.

Figure 3:
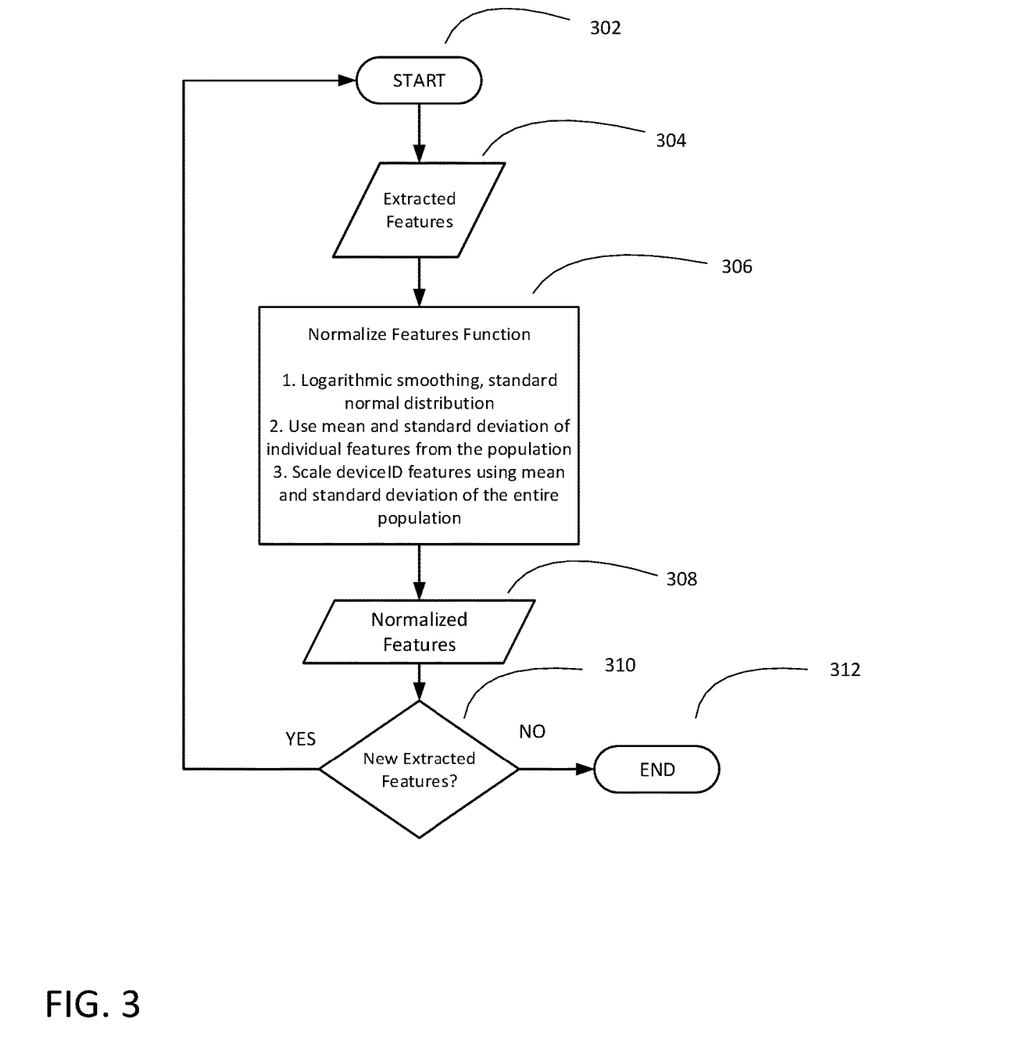
FIG. 3 is a process flow diagram illustrating a normalize features function consistent with certain embodiments of the present invention.

Turning to FIG. 3, a process flow diagram illustrating a feature normalization function consistent with certain embodiments of the present invention is shown. In an embodiment, the process begins at 302. Extracted application use features at 304 are input to a feature normalization function at 306. In a non-limiting example, the feature normalization function may use logarithmic smoothing with standard normal distribution. The function uses mean and standard deviation of individual features from the population as a foundation to create a standard normal distribution. The function scales deviceID features using mean and standard deviation of the entire population. The feature normalization function outputs normalized features at 308. If at 310 the system encounters new extracted features, the system begins the process anew. Otherwise, the process ends at 312.

Figure 4:
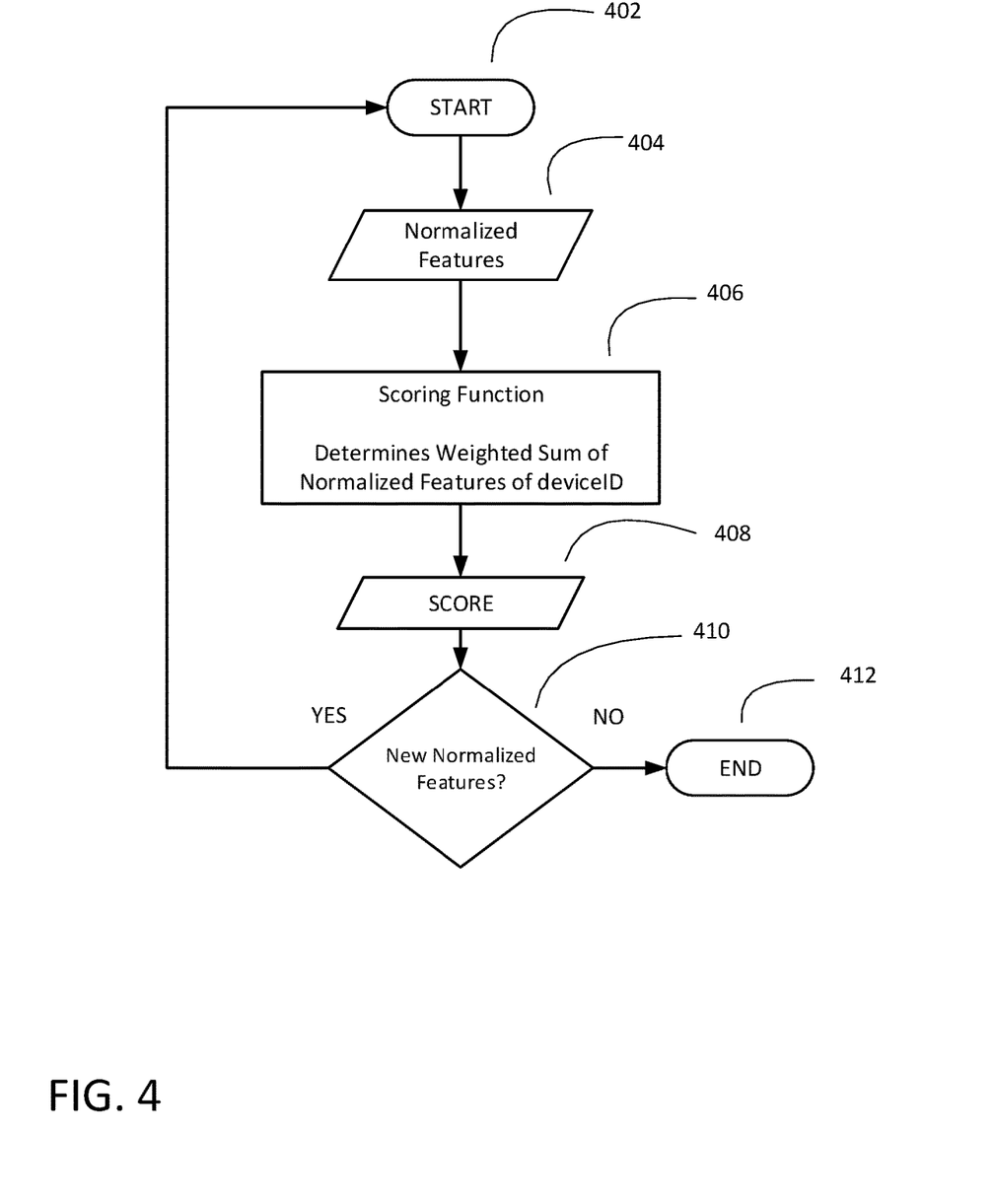
FIG. 4 is a process flow diagram illustrating a scoring function consistent with certain embodiments of the present invention.

Turning to FIG. 4, a process flow diagram illustrating a scoring function consistent with certain embodiments of the present invention is shown. In an embodiment, the process begins at 402. Normalized application use features at 404 are input to a scoring function at 406. In an embodiment, the scoring function determines the weighted sum of normalized features of a deviceID to improve the reliability of the captured data set with regard to geographic location of one or more mobile devices. At 408, the scoring function outputs a device score. In an embodiment, the score is indicative of the reliability of any prediction made as to device location determination. If at 410 the system encounters new normalized features, the process begins anew. Otherwise, the process ends at 412.

While certain illustrative embodiments have been described, it is evident that many alternatives, modifications, permutations and variations will become apparent to those skilled in the art in light of the foregoing description.

What is claimed is:

1. A system for determining and assigning high value geographic locations to a mobile device comprising:
   a. a mobile device in communication with one or more applications;
   b. initiating the operation of the one or more applications on the occurrence of a trigger event;
   c. storing the notification of a trigger event in a relational database maintained in an electronic storage element associated with the mobile device;
   d. storing the received trigger event and data parameters associated with the mobile device captured with said trigger event;
   e. extracting application use features;
   f. normalizing the application use features;
   g. an application server analyzing startup events recorded in the relational database according to the normalized application use features to determine one or more high value geographic locations;
   h. assigning said one or more high value geographic locations to the mobile device;
   i. displaying the determined one or more high value geographic locations on a display associated with the application server;
   where the analysis of startup events performed by the application server further comprises constructing a learning model to increase the confidence level of the one or more high value geographic locations, determining that the one or more high value geographic locations have changed, and/or determining that the times defining a daypart have changed.

2. The system of claim 1, further comprising a trigger event comprising a startup event or reception of an activation signal from a proximity activation system and received physical location data, an identifier associated with the mobile device, a timestamp associated with said trigger event, and application use features.

3. The system of claim 2, where the startup event is an event initiated by the initiation of one or more applications when the mobile device is not within range of a proximity activation system.

4. The system of claim 1, where the analysis of startup events performed by the application server comprises detection of spatial clustering of the physical location data associated with the daypart.

5. The system of claim 1, where the one or more high value geographic locations is a home location.

6. The system of claim 1, where the one or more high value geographic location is a work location.

7. The system of claim 1, further comprising making available the one or more high value geographic locations for use by other applications active on the mobile device via an Application Program Interface (API).

8. The system of claim 1, further comprising one or more sets of analysis and business rules, where the application server software analyzes the one or more high value geographic locations, the one or more sets of analysis and business rules, a current date and time, and a current location to determine a notification or message to deliver to the mobile device and delivering said notification or message.

9. The system of claim 1, where the normalizing is affected through logarithmic smoothing.

10. A method of determining and assigning high value geographic locations to a mobile device comprising:
   a. sending an event notification from a mobile device to an application server;
   b. the application server extracting physical location data, an identifier associated with said mobile device, and application use features from the notification;
   c. storing the physical location data, the identifier, and the application use features in a relational database;
   d. extracting the application use features;
   e. normalizing the application use features;
   f. analyzing the contents of the relational database according to the normalized application use features to determine one or more high value geographic locations, and assigning said one or more high value geographic locations to said mobile device;
   g. making the one or more high value geographic locations known to other applications within said mobile device; and
   h. displaying the determined one or more high value geographic locations on a display associated with the application server;
   i. determining an advertising message to deliver to said mobile device by analyzing the one or more high value geographic locations, one or more sets of analysis and business rules, a current date and time, and a current location.

11. The method of claim 10, where the step of sending a notification from a mobile device to an application server is responsive to an occurrence of a trigger event.

12. The method of claim 10, where the step of storing the physical location data and the identifier in a relational database further comprises time stamping the entries prior to storing said entries in the relational database.

13. The method of claim 10, where the step of analyzing the contents of the relational database to determine one or more high value geographic locations comprises filtering relational database entries to include only startup events in the analysis.

14. The method of claim 10, where the step of analyzing the contents of the relational database to determine one or more high value geographic locations comprises detecting spatial clustering of the physical location data.

15. The method of claim 14, where the step of analyzing the contents of the relational database comprises determining one or more high value geographic locations based upon spatial clustering of physical data associated with a daypart.

16. The method of claim 14, where the step of analyzing the contents of the relational database comprises constructing a learning model to increase the confidence level of the one or more high value geographic locations, to determine that one or more high value geographic locations have changed, or to determine that the times defining a daypart have changed.

17. The method of claim 10, where the step of making the one or more high value geographic locations known to other applications comprises publishing the one or more high value geographic locations through an Application Program Interface (API).

18. The method of claim 10, where the normalization is affected through logarithmic smoothing.

* * * * *